United States Patent
Kenthapadi (10) Patent No.: US 10,430,431 B2
(45) Date of Patent: Oct. 1, 2019

(54) RECOMMENDING COURSES FOR AN ELECTRONIC PRESENTATION

(71) Applicant: Microsoft Technology Licensing, LLC, Redmond, WA (US)

(72) Inventor: Krishnaram Kenthapadi, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 15/295,490

(22) Filed: Oct. 17, 2016

(65) Prior Publication Data

US 2018/0089285 A1 Mar. 29, 2018

Related U.S. Application Data (60) Provisional application No. 62/401,673, filed on Sep. 29, 2016.

(51) Int. Cl.
| | | |
|---|---|---|
| *G06F 16/248* | (2019.01) | |
| *G06F 16/9535* | (2019.01) | |
| *G06F 16/2457* | (2019.01) | |

(52) U.S. Cl.
CPC ...... *G06F 16/248* (2019.01); *G06F 16/24578* (2019.01); *G06F 16/9535* (2019.01)

(58) Field of Classification Search
CPC .......... G06F 17/30867; G06F 21/6245; G06F 17/30554; G06F 17/30336; G06F 21/604; G06F 21/6218; G06F 17/30958; G06F 2221/2115
USPC .................... 707/600–899, 999.001–999.206
See application file for complete search history.

(56) References Cited

U.S. PATENT DOCUMENTS

| | | | | |
|---|---|---|---|---|
| 2005/0114203 A1* | 5/2005 | Savitsky | ................ | G06Q 10/10 705/320 |
| 2009/0276231 A1* | 11/2009 | Bazigos | ............... | G06Q 10/105 705/320 |
| 2015/0248739 A1* | 9/2015 | Schulman | .......... | G06Q 50/2053 434/322 |
| 2017/0221164 A1* | 8/2017 | Loof | .................. | G06Q 50/2057 |
| 2017/0318073 A1* | 11/2017 | Bevis | .................. | G06F 16/9535 |

* cited by examiner

*Primary Examiner* — Angelica Ruiz (74) *Attorney, Agent, or Firm* — Schwegman Lundberg & Woessner, P.A.

(57) ABSTRACT

A course recommendation system is provided with an on-line social network system. The course recommendation system detects that an electronic presentation is being presented on a display device of a viewer, determines skills that are being discussed in the electronic presentation, and determines electronic courses that have been identified as associated with one or more skills discussed in the electronic presentation. References to one or more of the determined electronic courses are recommended to the viewer of the electronic presentation.

20 Claims, 4 Drawing Sheets

RECOMMENDING COURSES FOR AN ELECTRONIC PRESENTATION

CROSS-REFERENCE TO RELATED APPLICATIONS

This application claims the benefit of U.S. Provisional Application No. 62/401,673, filed Sep. 29, 2016, which is incorporated herein by reference in its entirety.

TECHNICAL FIELD

This application relates to the technical fields of software and/or hardware technology and, in one example embodiment, to system and method to identify relevant courses for an electronic presentation.

BACKGROUND

An electronic presentation (e.g., a slideshow produced using presentation software such as PowerPoint or a web-based slide-hosting service such as SlideShare) is a useful means for sharing information with colleagues, associates, and the public at large. The information being shared may include various concepts—scientific, technical, etc.—that are being referenced but not discussed in much detail due to the time constraints that limits the amount of information that can be reasonably imparted by a presentation. The presenter may rely on the existing knowledge of their audience or on the viewers' willingness to explore the concepts and topics of interest on their own, e.g., by taking a relevant in-person or an on-line course. A consumer of an electronic presentation may be a member of an on-line social network.

An on-line social network is a platform for connecting people in virtual space. An on-line social network may be a web-based platform, such as, e.g., a social networking web site, and may be accessed by a user via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize employment history and professional skills of the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system to identify relevant courses for an electronic presentation is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

As mentioned above, information being shared by means of an electronic presentation (also referred to as merely "presentation" for the purposes of this description) may include various concepts that are being referenced but not discussed in much detail due to the time constraints that limits the amount of information that can be reasonably imparted by a presentation. The presenter may rely on the existing knowledge of their audience or on the viewers' willingness to explore the concepts and topics of interest on their own, e.g., by taking a relevant on-line course.

It may be beneficial to automatically determine which skills are being referenced in a presentation, determine any relevant electronic courses that could be used to get more familiar with the skills discussed in the presentation, and display references to such courses to the viewer of the presentation as a recommendation. References to the recommended courses may be presented as decoration for the presentation of search results, such that the search requestor is provided with an indication that the presentation referenced in the search results is designated as associated with one or more relevant electronic courses that may be available for access or preview during the rendering of the presentation. In some embodiments, references to the recommended courses may be presented at the beginning or at the end of the presentation. A skill, for the purposes of this description is an item of information that represents a skill of a member in an on-line social network system and that is stored in a skills database maintained by the on-line social network system. Each skill-related entry in the skills database includes a phrase (e.g., "programming" or "patent prosecution") that can appear in a member profile maintained by the on-line social network system in one or more designated profile sections, such as, e.g., in the skills and endorsements section of a profile.

For the purposes of this description the phrases "an on-line social networking application" and "an on-line social network system" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. Each member of an on-line social network is represented by a member profile (also referred to as a profile of a member or simply a profile). A member profile may be associated with social links that indicate the member's connection to other members of the social network. A member profile may also include or be associated with comments or recommendations from other members of the on-line social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network. Members that are connected in this way to a particular member may be referred to as that particular member's connections or as that particular member's network. The profile information of a social network member may include various information such as, e.g., the name of a member, current and previous geographic location of a member, current and previous employment information of a member, information related to education of a member, information about professional accomplishments of a member, publications, patents, etc. As mentioned above, the profile information of a social network member may also include information about the member's professional skills.

In one embodiment, the system to identify relevant courses for an electronic presentation is implemented as a so-called course recommendation system that is provided as part of or associated with the on-line social network system. The course recommendation system selects courses that have been identified as associated with one or more skills discussed in the presentation and determines, for each such course, a relevance score that reflects how relevant the course is to skills discussed in the presentation. The course recommendation system can be configured to generate the relevance scores and also to access previously stored relevance scores. The courses are then ranked based on their respective relevance values, and those courses that have been assigned the highest relevance scores are selected as being most relevant. References to these most relevant courses are recommended to the viewer of the presentation. Electronic courses that are being evaluated by the course recommendation system in order to determine whether a particular course is relevant enough to one or more skills discussed in a presentation may be provided by the on-line social network or another provider.

A relevance score may be generated for a course with respect to skills discussed in the entire presentation or with respect to skills discussed in a section of a presentation, e.g., for skills discussed in a particular slide in an electronic slideshow presentation. In some embodiments, the course recommendation system generates, for a course, separate relevance scores for separate sections of a presentation and then aggregates those separate relevance scores to generate the final relevance score for the course, which is to be treated as indicating relevance of the course to skills discussed in the entire presentation.

Equation (1) below is an example of calculating the relevance score of a course v with respect to all combined sections i in a presentation D.

$$relscore(v) = \sum_{i \in D} relscore(v, i) \times \text{significance}(i) \quad \text{Equation (1)}$$

where different sections i in a presentation D are assigned different significance values significance (i). A significance value for a section in a presentation may be assigned based on various predetermined criteria, such as, e.g., the positioning of a section within the document, the hierarchy of the presentation, etc. Some example methodologies for calculating relevance score for a course with respect to a section in a presentation are described below.

In one embodiment, in order to generate relevance score for a course with respect to a section in a presentation the course recommendation system first selects a set of most important skills discussed in a presentation section. The skills detected in a presentation section may be identified as most important skills based on their respective importance scores. The importance score for a skill c in a presentation section i may be notated as impscore (c, i) and may be determined using any of the approaches described further below. The course recommendation system maintains or has access to an inverted index of skill-to-course mappings (also referred to as an inverted index of skills), where, for a course v and a skill c, a mapping entry in the inverted index is in the form of:

skill (c)→List of (course (v), weight w (v, c)), where the weight w is a value assigned to a course/skill pair to indicate the relevance (also referred to as the weight) of the course v for imparting the skill c. The weight w for a course/skill pair may be determined based on the results of processing content and metadata of a given electronic course together with historical data reflecting how members of the on-line social network system have been interacting with the course.

After having identified the skills that are being discussed or that are associated with presentation section, the course recommendation system forms a search query consisting of the most important skills in the presentation section i and queries the inverted index of skill-to-course mappings. Based on the result of the query, the course recommendation system generates the candidate set V(i) of courses corresponding to the skills search query for the section i. The course recommendation system then performs aggregation of the skill-course weights w (v, c) and section-skill importance scores impscore (c, i) in order to rank the retrieved courses. A course that has large skill weights for several important skills in a presentation section is considered as relevant for the section. Thus, the relevance score of a course v in the candidate set V(i) of courses corresponding to the skills search query for the section i can be calculated using Equation (2) shown below.

$$relscore(v,i) = h(\{((\text{impscore}(c,i), w(v,c)) | c \in C(i)\}), \quad \text{Equation (2)}$$

where h is an aggregation function. For example, relscore (v, i) can be calculated as the sum of products of the importance score of a skill c with respect to the section i, impscore (c, i), and the weight of the course v for imparting the skill c, w (v, c), for all skills c in the set of skills C(i), using Equation (3) below.

$$relscore(c, i) = \sum_{c \in C} impscore(c, i) \times w(v, c) \qquad \text{Equation (3)}$$

In some embodiments, the weight of the course v for imparting the skill c, w (v, c), is binary; that is, it indicated that the course either imparts a certain skill or it does not. In this scenario, the relevance value for a course is generated based on the combined importance of all skills that are associated with the course in the inverted index of skill-to-course mappings.

In some embodiments, the importance score of a skill c with respect to the section i, impscore (c, i), is binary, that is, a skill is associated with (discussed or referenced in) the section i, or not. In this scenario, the relevance value for a course c is generated based on the combined weights w (v, c) associated with those skills that have been identified as most important for section i in the presentation and can be learned from the course.

In some embodiments, the weight of a course v for imparting the skill c, w (v, c), is not used. In this scenario, if the skills in the inverted index of skill-to-course mappings are ordered by decreasing weights w (v, c), the course recommendation system could use the ordering in the inverted index to rank the courses. In this case, the courses could be ranked by rank aggregation across the important skills, for example, using Borda Count method.

As mentioned above, the course recommendation system selects a so-called presentation set of courses based on the respective relevance values generated for the courses in the candidate set of courses. For example, the presentation set of courses may include a certain number courses that have the top ranks with respect to the section in the presentation. In another example, the presentation set of courses includes those courses from the candidate set that have relevance values greater or equal to a predetermined threshold. References from the set of courses presentation set of courses are exposed to the viewer at the time the viewer is viewing the associated section of the presentation.

In some embodiments, the course recommendation system may be configured to generate contextual course recommendations: as the viewer transitions from one presentation section to another, e.g., by paging through the slideshow, the associated presentation of course recommendations is generated or accessed, where the courses to be recommended as relevant to the currently viewed section of the presentation are determined using one of the methodologies discussed above. The course recommendation system may also be configured to detect if the viewer interacted with the presented reference to a recommended course (e.g., if the viewer clicked on the course recommendation) and to omit presentation of that course in any of the subsequently presented sections.

As explained above, the course recommendation system, in the process of determining the relevance of a course with respect to a presentation or with respect to a section of a presentation, may utilize the importance value of a skill c with respect to a presentation section i; this importance value notated above as impscore (c, i). Some example methodologies for generating the importance score of a skill with respect to a presentation section are described below.

In one embodiment, a so-called skills detector system may be used to determine which skills are referenced in an electronic presentation and to also generate respective importance scores of the determined skills as related to the presentation. The skills detector system is provided as part of or associated with the on-line social network system. The skills detector system is configured to determine which skills referenced in the presentation and may also be configured also determine respective importance scores of the determined skills as related to the presentation. In order to identify a phrase that appears in a presentation as representing a skill, the skills detector system determines whether the phrase is included in the skills database maintained by the on-line social network system. Respective importance scores of the determined skills may be generated as described below.

The skills detector system, according to some embodiments, is configured to construct a skills graph for a presentation, with nodes representing respective skills and edges being assigned a weight value that represent the degree of relatedness of the respective two skills represented by the two connecting nodes. For example, the two skills "patent prosecution" and "patent drafting" have a greater degree of relatedness than, e.g., the two skills "patent prosecution" and "landscape design." The skills detector system may be configured to assign a value between "0" and "1" to an edge in a skills graph, e.g., with the greater value assigned to an edge indicating the greater degree of relatedness of the respective two skills represented by the two connecting nodes. Each section of a presentation is thus represented as part of a skills graph. A section in a presentation may correspond to a slide (as in a PowerPoint or a SlideShare presentation), or to a portion of a document included in a chapter or under a headings.

Where the skills detector system generates a skills graph for a presentation, it can calculate a so-called centrality score for each node of the skills graph (and thus for each detected skill). Respective centrality scores for the nodes in the skills graph may be determined by applying a graph analysis algorithm, such as, e.g., PageRank. The centrality score for a skill c in a presentation section i is notated as alpha (c, i).

The skills detector system also associates each skill detected in a presentation with a so-called document structure score, which can be determined by examining the structure in the presentation. For example, a skill represented by a phrase that occurs in the title of the presentation is assigned a larger document structure score than a skill identified by a phrase that occurs only in the body of the presentation. As another example, a skill represented by a phrase that is found under one of the top-level bullets is assigned a higher document structure score than a phrase representing a skill is found under one of the lower-level bullets. The document structure score for a skill c in a presentation section i is notated as beta (c, i).

Where the skills detector system generates a skills graph and, for each detected skill generated a respective document structure score, the importance score for a skill c in a presentation section i is calculated based on the associated centrality score alpha (c, i) and the associated document structure score beta (c, i), using Equation (3) below. Thus calculated importance score is notated as gamma (c, i).

$$\text{gamma}(c,i) = f(\text{alpha}(c,i), \text{beta}(c,i)), \qquad \text{Equation (3)}$$

where f(.,.) is a monotonically increasing function of two variables, such as, e.g., f(x,y)=xy, or f(x,y)=x·exp(y).

In some embodiments, the skills detector system is configured to represent each section in a presentation as a feature vector in high-dimensional space. Some examples of dimensions, in addition to the skill dimension, are title, level in the document structure hierarchy, emphasis in the text presentation (e.g., whether the phrase representing a skill is highlighted, bold, italicized, etc.), occurrence of the skill in previous sections, and occurrence of the skill in subsequent sections. The skills detector system utilizes machine learning techniques to learn a statistical model for calculating the predicted importance score delta (c, i) for a skill c in a presentation section i. The learned model takes, as input, a matrix with skills detected in the presentation section i as rows and features related to the document section (e.g., title, level, emphasis) as columns. The ground truth consists of sections together with the labeled set of important skills.

In some embodiments, the approaches described above for calculating the importance score for a skill c in a presentation section i as lambda(c,i)=g (gamma (c, i), delta (c, i)), where g(.,.) is a function of two variables, such as, e.g. a convex combination, g(x, y)=rx+(1−r)y, where r is a predetermined coefficient expressing respective weights to be assigned to x and y.

In some embodiments, the skills detector system is configured to select from the detected skills a set of most important skills in a section i, C(i) along with their corresponding importance scores calculated using one of the methodologies described above, and present it to the viewer. For example, the skills detector system may determine that a certain section in a subject presentation discusses two skills—"grant writing" and "proofreading"- and calculate respective importance scores for each of these skills. When that section of the subject presentation is being viewed by a user, the user can also be presented with the information regarding the skills being discussed in the section, their respective importance scores and an explanation of the importance scores (e.g., explaining that the importance scores were calculated based on the placement of the corresponding phrases within the document structure). Once the skills detector system determines the skills in each section of the presentation and their respective importance scores, this information may be stored as associated with the presentation and used, by the course recommendation system to recommend one or more educational programs or on-line courses that are relevant to one or more of these associated skills. An example course recommendation system may be implemented in the context of a network environment 100 illustrated in FIG. 1.

Figure 1:
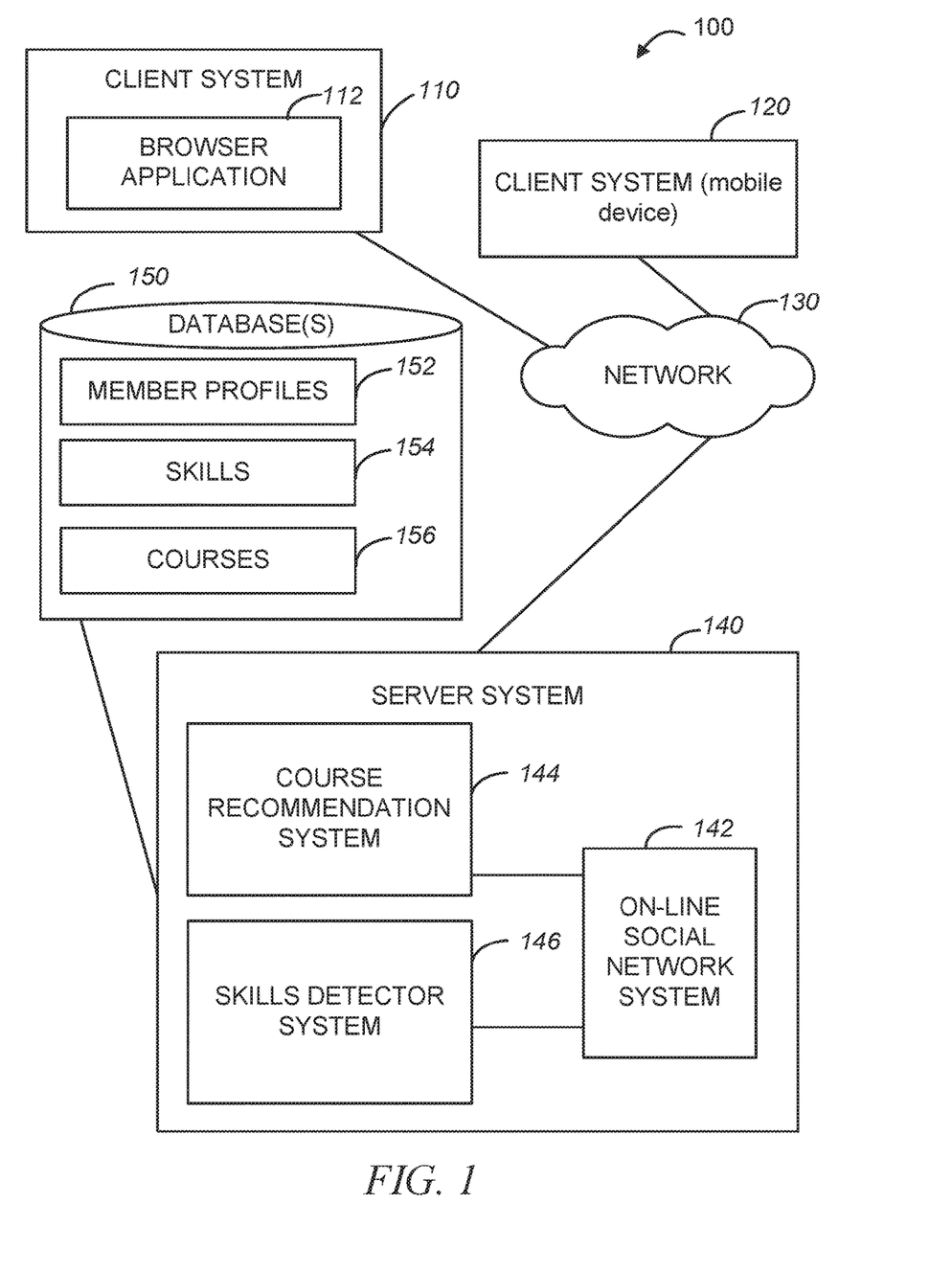
FIG. 1 is a diagrammatic representation of a network environment within which an example method and system to identify relevant courses for an electronic presentation may be implemented.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a course recommendation system 144. The course recommendation system 144 is configured to detect that an electronic presentation is being presented to a viewer on a display device, to determine skills discussed in a presentation, to determine courses that have been identified as associated with one or more skills discussed in the presentation, rank the courses based on their respective relevance values, and recommend to the viewer of the presentation those courses that have been assigned the highest relevance scores. Electronic courses that are being evaluated by the course recommendation system in order to determine whether a particular course is relevant enough to one or more skills discussed in a presentation may be provided by the on-line social network and stored as courses 156 in the database 150.

The server system 140 also hosts a skills detector system 146. The skills detector system 146 is configured to determine which skills are referenced in a presentation and generate respective importance scores of the determined skills as related to the presentation. As explained above, in order to identify a phrase that appears in a presentation as representing a skill, the skills detector system 146 determines whether the phrase is included in a skills database 154 maintained by the on-line social network system 142. The skills detector system 144 determines respective importance scores of the determined skills using any of the methodologies described above. An example course recommendation system 144 is illustrated in FIG. 2.

Figure 2:
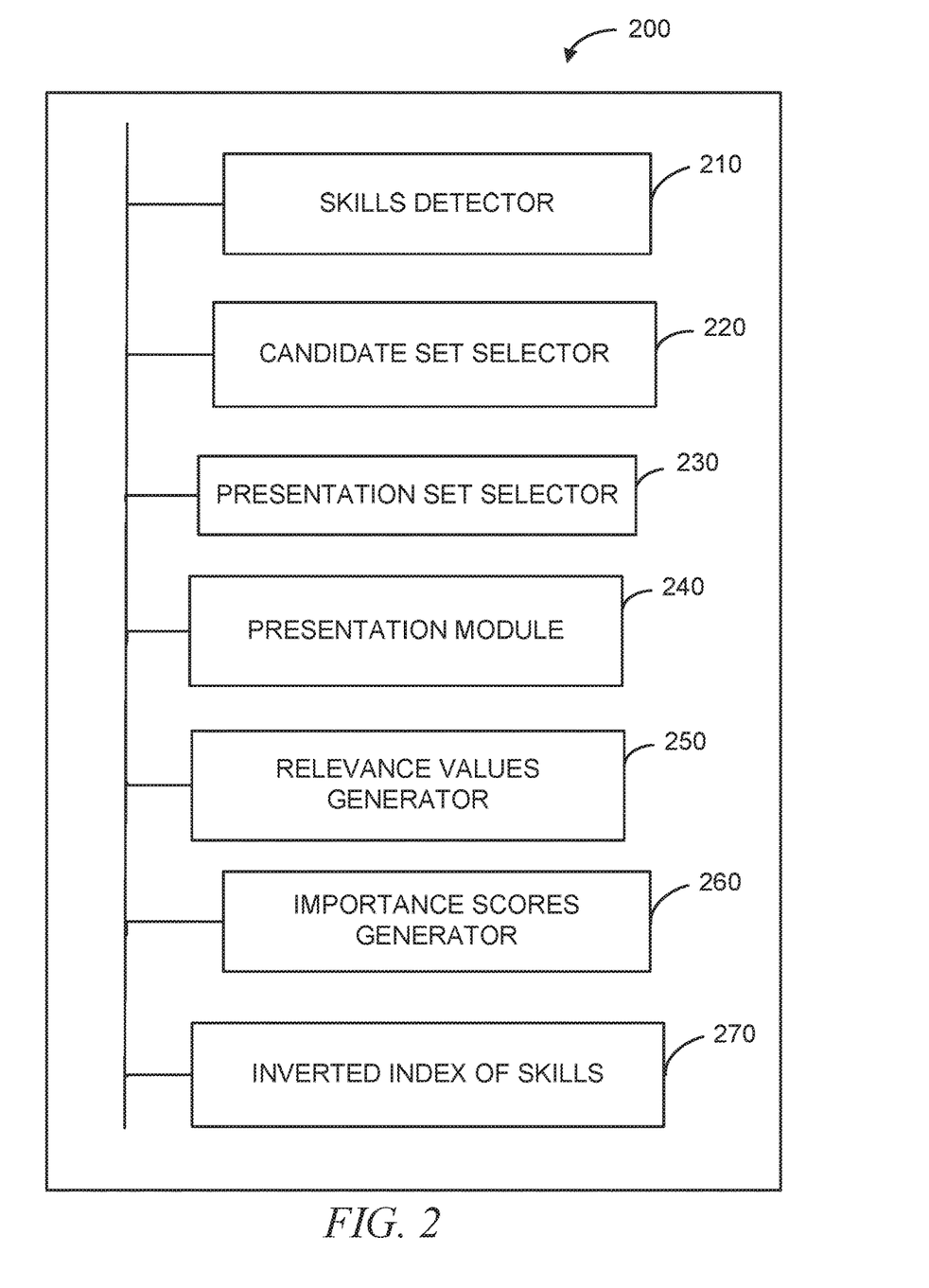
FIG. 2 is block diagram of a system to identify relevant courses for an electronic presentation, in accordance with one example embodiment.

FIG. 2 is a block diagram of a system 200 to detect relevant courses for an electronic presentation 142 of FIG. 1. As shown in FIG. 2, the system 200 includes a skills detector 210, a candidate set selector 220, and a presentation set selector 230. The skills detector 210 is configured to detect an event indicating rendering of the electronic presentation on the display device and, in response, determine a set of skill identifications associated with an electronic presentation. Each item in the set of skill identifications represents respective skills that correspond to respective entries in the skills database 154 of FIG. 1 maintained by the on-line social network system 142 of FIG. 1. As described above, a profile from member profiles maintained in the on-line social network system 142 includes a skills section that can be populated with one or more values corresponding to respective entries the skills database 154. The skills detector 210 may access the previously stored set of skill identifications associated with the electronic presentation or it can generate set of skill identifications by examining the presentation, using the methodologies discussed above.

The candidate set selector 220 is configured to determine, using the set of skill identifications associated with the electronic presentation, a candidate set of electronic courses. Each item in the candidate set of courses is a course identification representing a course that has been associated with a skill represented by an item from the set of skill identifications. The presentation set selector 230 is configured to select a presentation set of courses from the candidate set of courses based on respective relevance values assigned to each item in the candidate set of courses. In some embodiments, candidate set selector 220 determines a candidate set of courses with respect to an electronic presentation in response to an event indicating rendering of the electronic presentation on a display device.

The presentation module 240 is configured to cause presentation of a reference to a course on a display device, as associated with the electronic presentation. As mentioned above, references to the recommended courses may be presented as decoration for the presentation of search results, such that the search requestor is provided with an indication that the presentation referenced in the search results is designated as associated with one or more relevant electronic courses that may be available for access or preview during the rendering of the presentation. In some embodiments, references to the recommended courses may be presented at the beginning or at the end of the presentation, or as associated with a section on a presentation (e.g., as associated with a particular slide in an electronic slide presentation). The presentation module 240 may be configured to cause the presentation of the reference to the course from the presentation set of courses in response to detecting an event indicating rendering of the electronic presentation on the display device.

Also shown in FIG. 2 are a relevance values generator 250, an importance scores generator 260, and an inverted index of skills 270. The relevance values generator 250 is configured to generate respective relevance values for items in the candidate set of courses. In generating the relevance values, the relevance values generator 250 may utilize importance scores that could be assigned to items in the set of skill identifications. The importance scores with respect to skills associated with a presentation may be generated by the importance scores generator 260, using the methodologies described above e.g., based on the structure of the associated electronic presentation. In some embodiments, in generating the relevance values, the relevance values generator 250 may utilize respective weight values assigned to items in the candidate set of courses with respect to the electronic presentation. A weight value associated with a course with respect to an electronic presentation reflects probability of the course to impart a particular skill associated with the electronic presentation. The mapping between electronic courses and skills and the respective weight values are stored in the inverted index of skills 270. An entry in the inverted index of skills comprises a skill identification with an associated course identification. In some embodiments, the candidate set selector 220 is configured to query the inverted index of skills 270 to determine the candidate set of courses. Some operations performed by the system 200 may be described with reference to FIG. 3.

Figure 3:
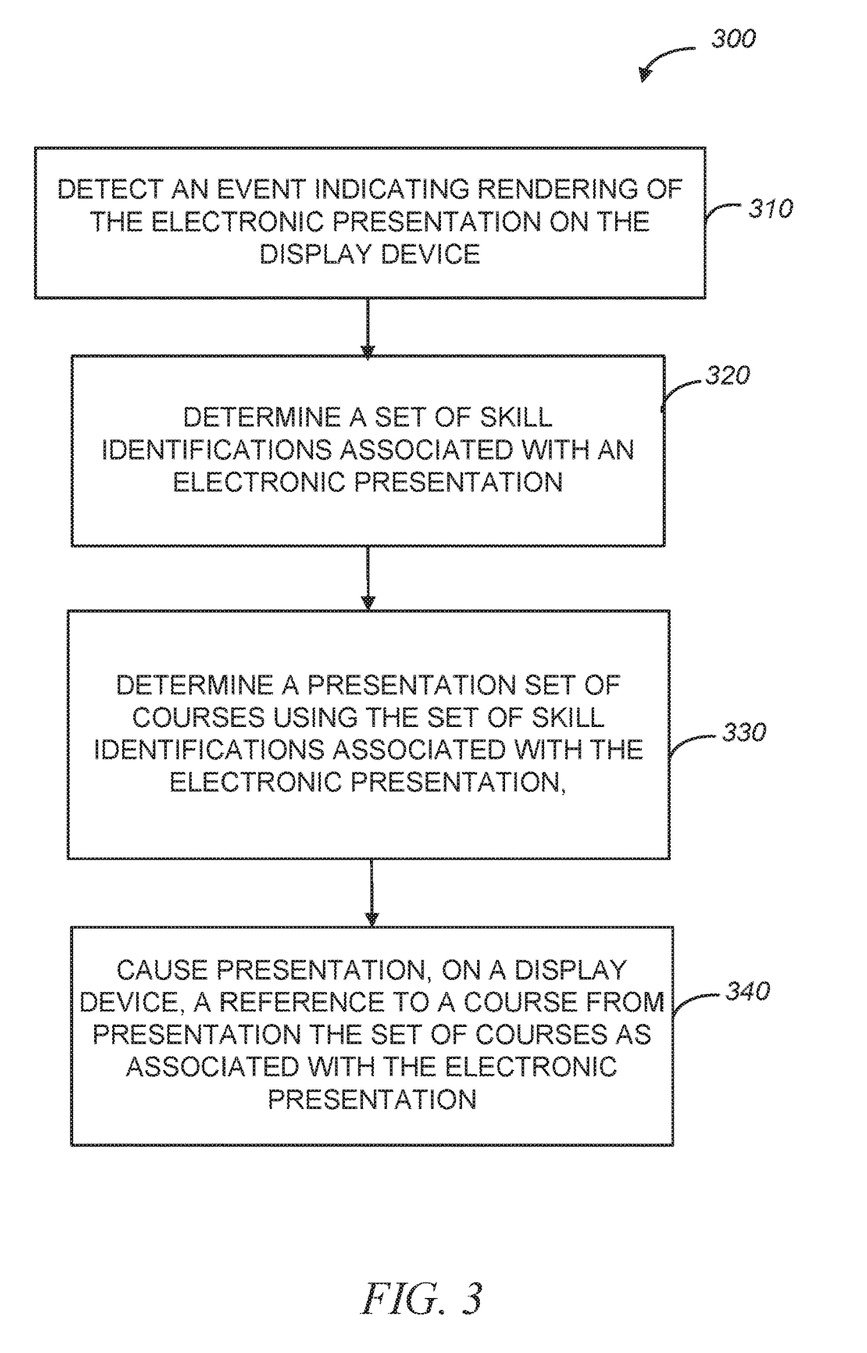
FIG. 3 is a flowchart illustrating a method to identify relevant courses for an electronic presentation, in accordance with an example embodiment.

FIG. 3 is a flowchart of a method 300 to detect relevant courses for an electronic presentation 142 of FIG. 1. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the skills detector 210 of FIG. 2 detects an event indicating rendering of the electronic presentation on the display device and determines a set of skill identifications associated with an electronic presentation at operation 320. At operation 330, the presentation set selector 230 of FIG. 2 selects a presentation set of courses from the candidate set of courses. At operation 340, the presentation module 240 of FIG. 2 causes presentation of a reference to a course on a display device, as associated with the electronic presentation.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 4:
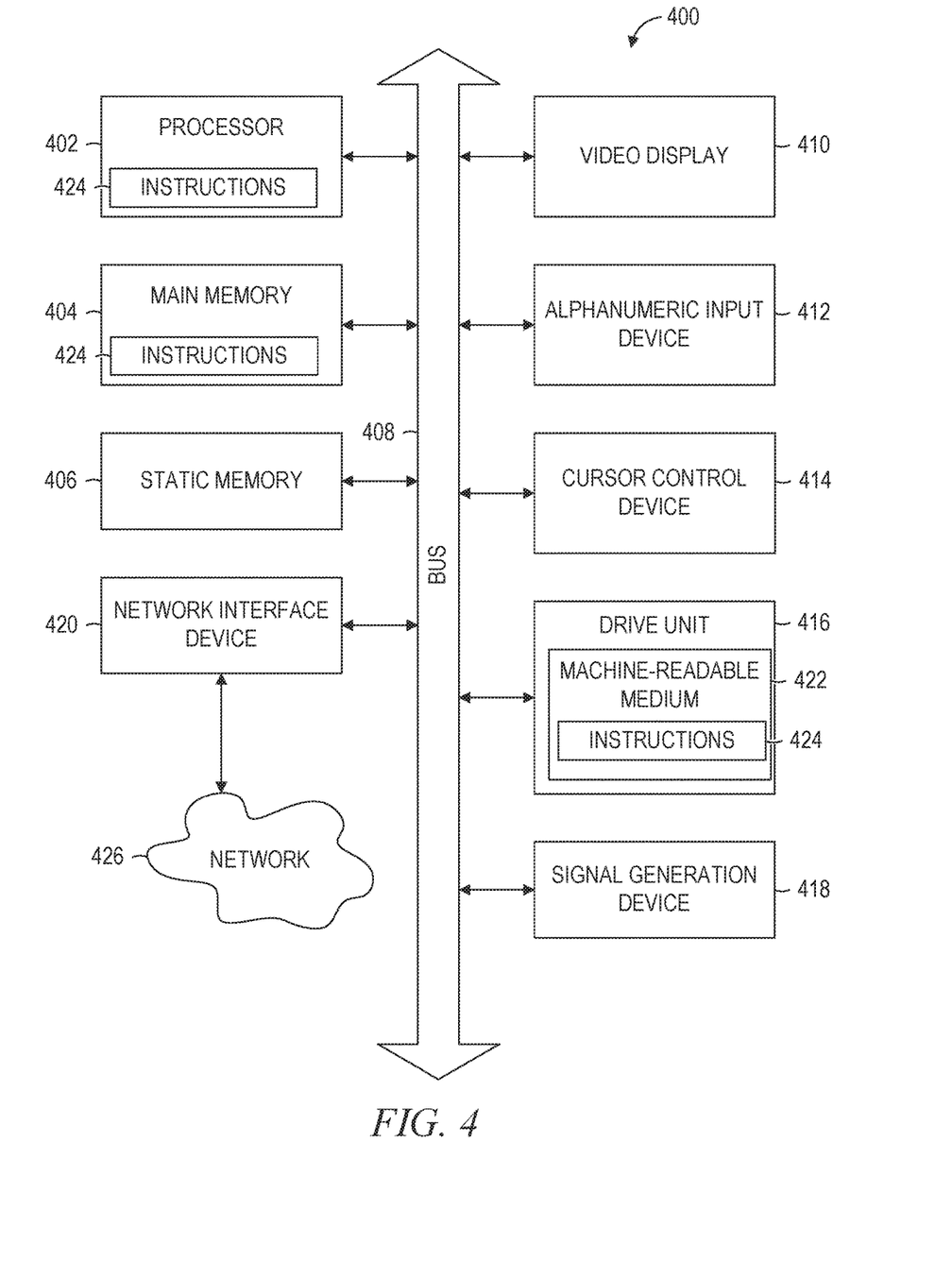
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to identify electronic courses for an electronic presentation has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer implemented method comprising:
maintaining member profiles representing members in an on-line social network system, a profile from the member profiles comprising a skills section populated with one or more values corresponding to respective entries from a skills database;
detecting an event indicating rendering of an electronic presentation on a display device; and
in response to the detecting of the rendering of the electronic presentation on the display device:
determining a set of skill identifications associated with the electronic presentation, an item from the set of skill identifications representing respective skills that correspond to respective entries in the skills database and representing a skill discussed in the electronic presentation,
with respect to the electronic presentation that is being rendered on the display device, determining, using the set of skill identifications associated with the electronic presentation, a presentation set of courses, an item in the presentation set of courses comprising a course identification representing a course that has been associated with a skill represented by an item from the set of skill identifications, and
causing presentation, on the display device, a reference to a course from the presentation the set of courses as associated with the electronic presentation.

2. The method of claim 1, comprising:
generating respective relevance values for items in a candidate set of courses, an item in the candidate set of courses comprising a course identification representing a course that has been associated with a skill represented by an item from the set of skill identifications
selecting the presentation set of courses from a candidate set of courses based on respective relevance values assigned to each item in the candidate set of courses; and
selecting of the presentation set of courses from items in the candidate set of courses based on the respective relevance values for items in the candidate set of courses.

3. The method of claim 2, wherein each item in the set of skill identifications associated with a respective importance score, the generating of the respective relevance values for each item in the candidate set of courses comprises using the importance scores.

4. The method of claim 3, comprising generating the respective importance scores for skills in the set of skill identifications based on determined structure of the electronic presentation.

5. The method of claim 3, comprising accessing previously stored respective importance scores for skills in the set of skill identifications.

6. The method of claim 2, wherein the generating of a relevance value from the respective relevance values comprises using a weight value assigned to an item in the candidate set of courses with respect to the electronic presentation.

7. The method of claim 6, wherein the weight value reflects probability of a course represented by the item to impart a skill associated with the electronic presentation.

8. The method of claim 1, wherein the determining of the candidate set of courses comprises querying an inverted index of skills, an entry in the inverted index of skills comprising a skill identification with an associated course identification, the skill identification corresponding to an entry in the skills database.

9. The method of claim 1, wherein the determining of the set of skill identifications associated with the electronic presentation is in response to detecting an event indicating rendering of the electronic presentation on the display device.

10. The method of claim 1, wherein the electronic presentation is an electronic slideshow presentation stored by the on-line social network system.

11. A computer-implemented system comprising:
one or more processors; and
a non-transitory, computer readable storage medium comprising instructions that when executed by the one or processors cause the one or more processors to perform operations comprising:
maintaining member profiles representing members in an on-line social network system, a profile from the member profiles comprising a skills section populated with one or more values corresponding to respective entries from a skills database;
detecting an event indicating rendering of an electronic presentation on a display device; and
in response to the detecting of the rendering of the electronic presentation on the display device;
determining a set of skill identifications associated with the electronic presentation, an item from the set of skill identifications representing respective skills that correspond to respective entries in the skills database and representing a skill discussed in the electronic presentation,
with respect to the electronic presentation that is being rendered on the display device, determining, using the set of skill identifications associated with the electronic presentation, a presentation set of courses, an item in the presentation set of courses comprising a course identification representing a course that has been associated with a skill represented by an item from the set of skill identifications,
causing presentation, on the display device, a reference to a course from the presentation the set of courses as associated with the electronic presentation.

12. The system of claim 11, to perform operations comprising:
determining, using the set of skill identifications associated with the electronic presentation, a candidate set of courses, an item in the candidate set of courses comprising a course identification representing a course that has been associated with a skill represented by an item from the set of skill identifications;
generating respective relevance values for items in the candidate set of courses, wherein the presentation set selector is to select the presentation set of courses from items in the candidate set of courses based on the respective relevance values for items in the candidate set of courses.

13. The system of claim 12, wherein each item in the set of skill identifications associated with a respective importance score, the relevance values generator is to generate respective relevance values using the respective importance scores.

14. The system of claim 13, to perform operations comprising generating respective importance scores for skills in the set of skill identifications based on determined structure of the electronic presentation.

15. The system of claim 13, to perform operations comprising accessing previously stored respective importance scores for skills in the set of skill identifications.

16. The system of claim 12, to perform operations comprising generating a relevance value from the respective relevance values using a weight value assigned to an item in the candidate set of courses with respect to the electronic presentation.

17. The system of claim 16, wherein the weight value reflects probability of a course represented by the item to impart a skill associated with the electronic presentation.

18. The system of claim 11, wherein the determining of the candidate set of courses comprises querying an inverted index of skills, an entry in the inverted index of skills comprising a skill identification with an associated course identification, the skill identification corresponding to an entry in the skills database.

19. The system of claim 11, wherein the determining of the set of skill identifications associated with the electronic presentation is in response to detecting an event indicating rendering of the electronic presentation on the display device.

20. A machine-readable non-transitory storage medium having instruction data executable by a machine to cause the machine to perform operations comprising:
  maintaining member profiles representing members in an on-line social network system, a profile from the member profiles comprising a skills section populated with one or more values corresponding to respective entries from a skills database;
  detecting an event indicating rendering of an electronic presentation on a display device; and
  in response to the detecting of the rendering of the electronic presentation on the display device:
    determining a set of skill identifications associated with the electronic presentation, an item from the set of skill identifications representing respective skills that correspond to respective entries in the skills database and representing a skill discussed in the electronic presentation,
    with respect to the electronic presentation that is being rendered on the display device, determining, using the set of skill identifications associated with the electronic presentation, a presentation set of courses, an item in the presentation set of courses comprising a course identification representing a course that has been associated with a skill represented by an item from the set of skill identifications, and
    causing presentation, on the display device, a reference to a course from the presentation the set of courses as associated with the electronic presentation.

* * * * *

UNITED STATES PATENT AND TRADEMARK OFFICE
CERTIFICATE OF CORRECTION

| | | |
|---|---|---|
| PATENT NO. | : 10,430,431 B2 | Page 1 of 1 |
| APPLICATION NO. | : 15/295490 | |
| DATED | : October 1, 2019 | |
| INVENTOR(S) | : Krishnaram Kenthapadi | |

It is certified that error appears in the above-identified patent and that said Letters Patent is hereby corrected as shown below:

In the Claims

In Column 14, Line 27, in Claim 11, delete "device;" and insert --device:-- therefor Signed and Sealed this
Third Day of November, 2020

Andrei Iancu
*Director of the United States Patent and Trademark Office*